Dec. 11, 1928.
A. H. ALLEN
1,695,133
COMBINATION SANITARY REFRIGERATOR AND WASTE DISPOSAL APPARATUS
Filed April 21, 1926   5 Sheets-Sheet 3
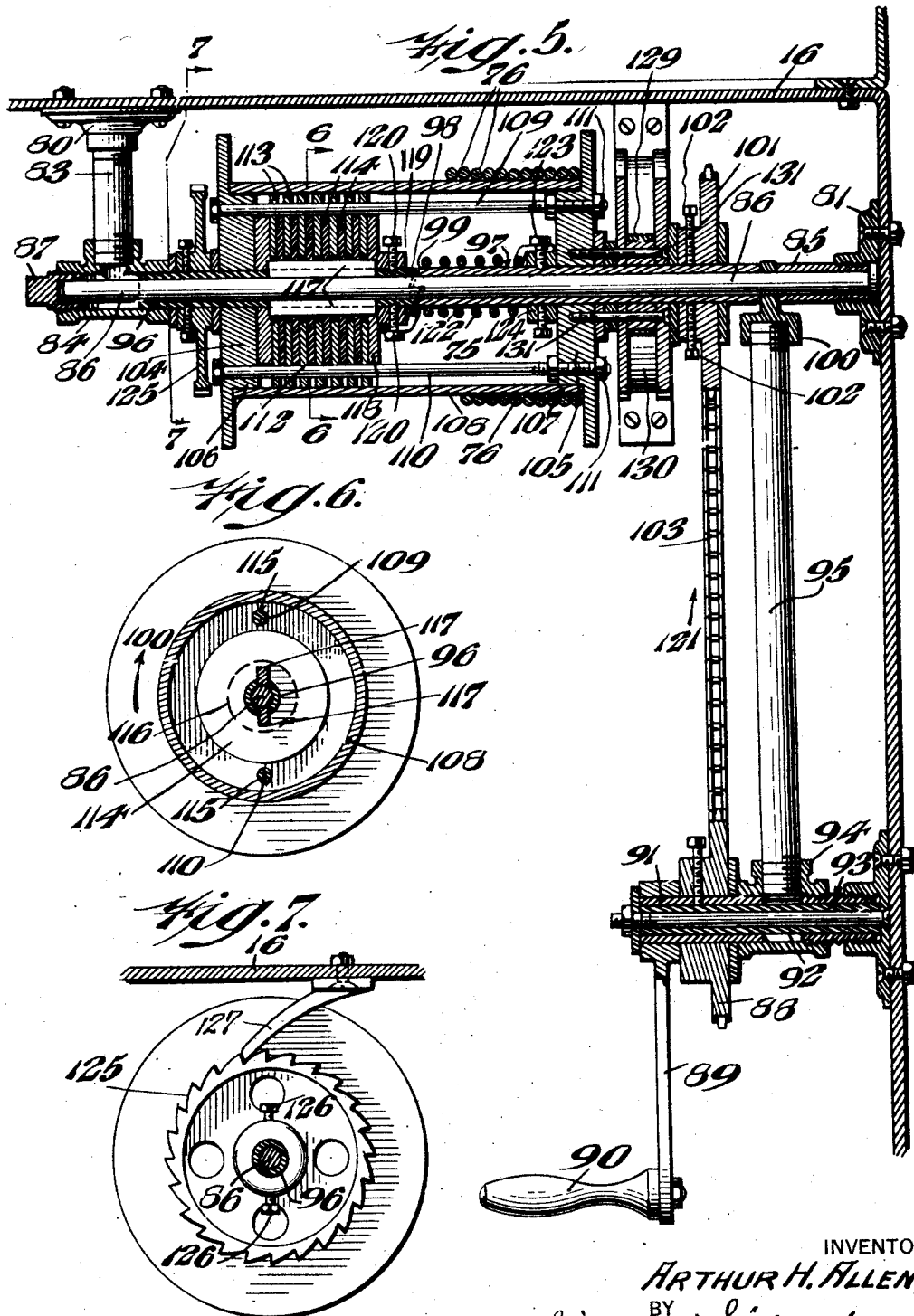
INVENTOR:
ARTHUR H. ALLEN,
BY
ATTORNEYS.

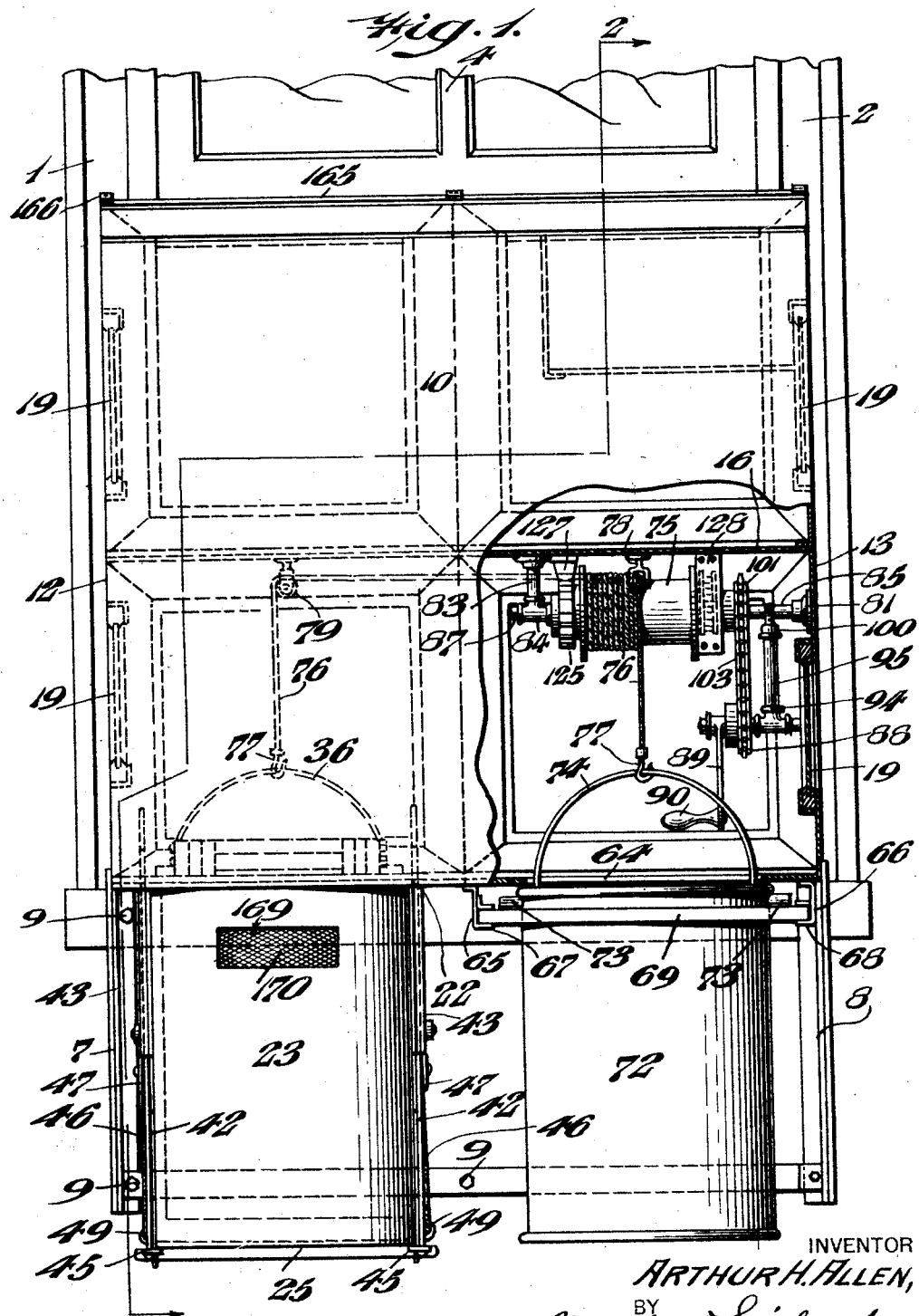

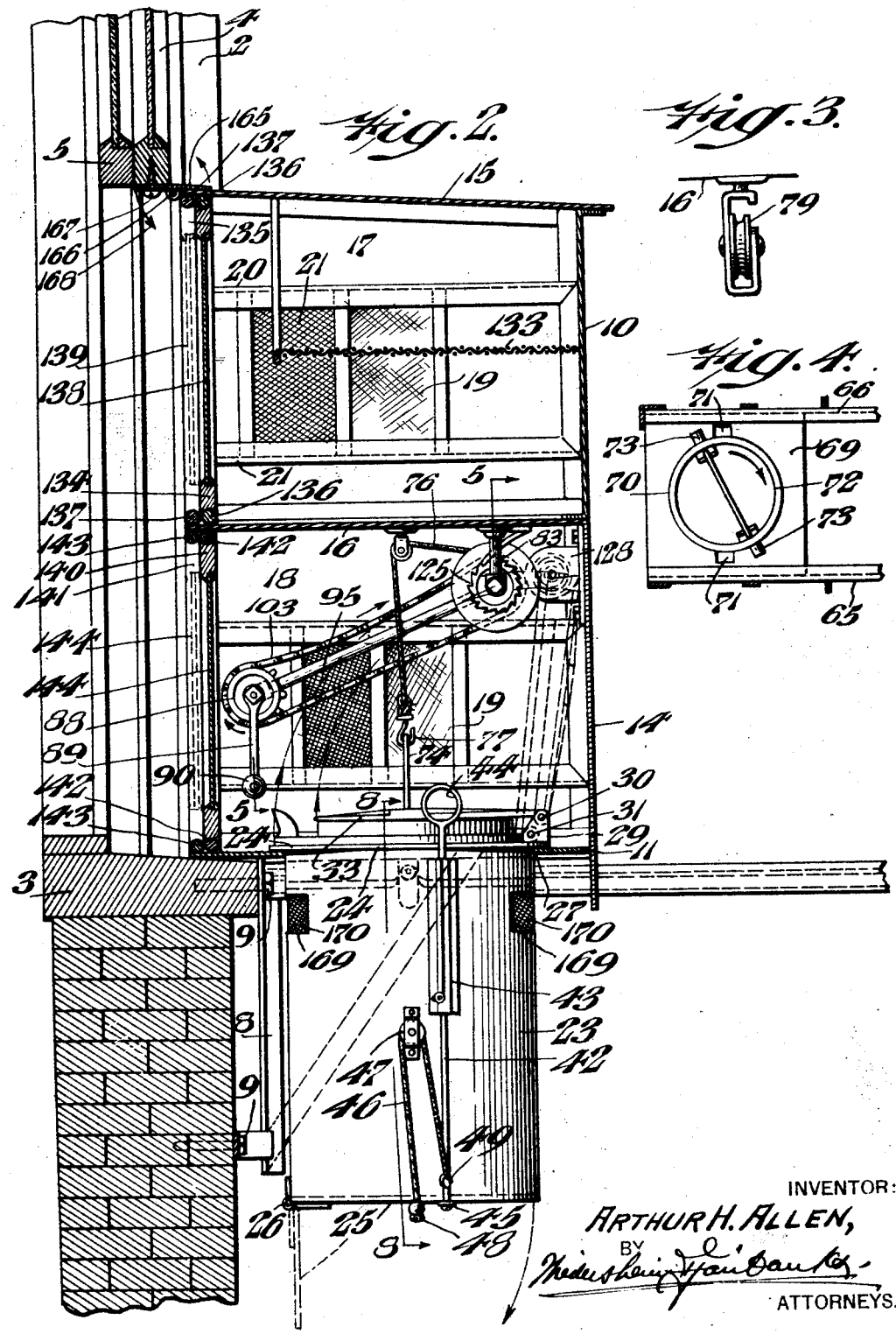

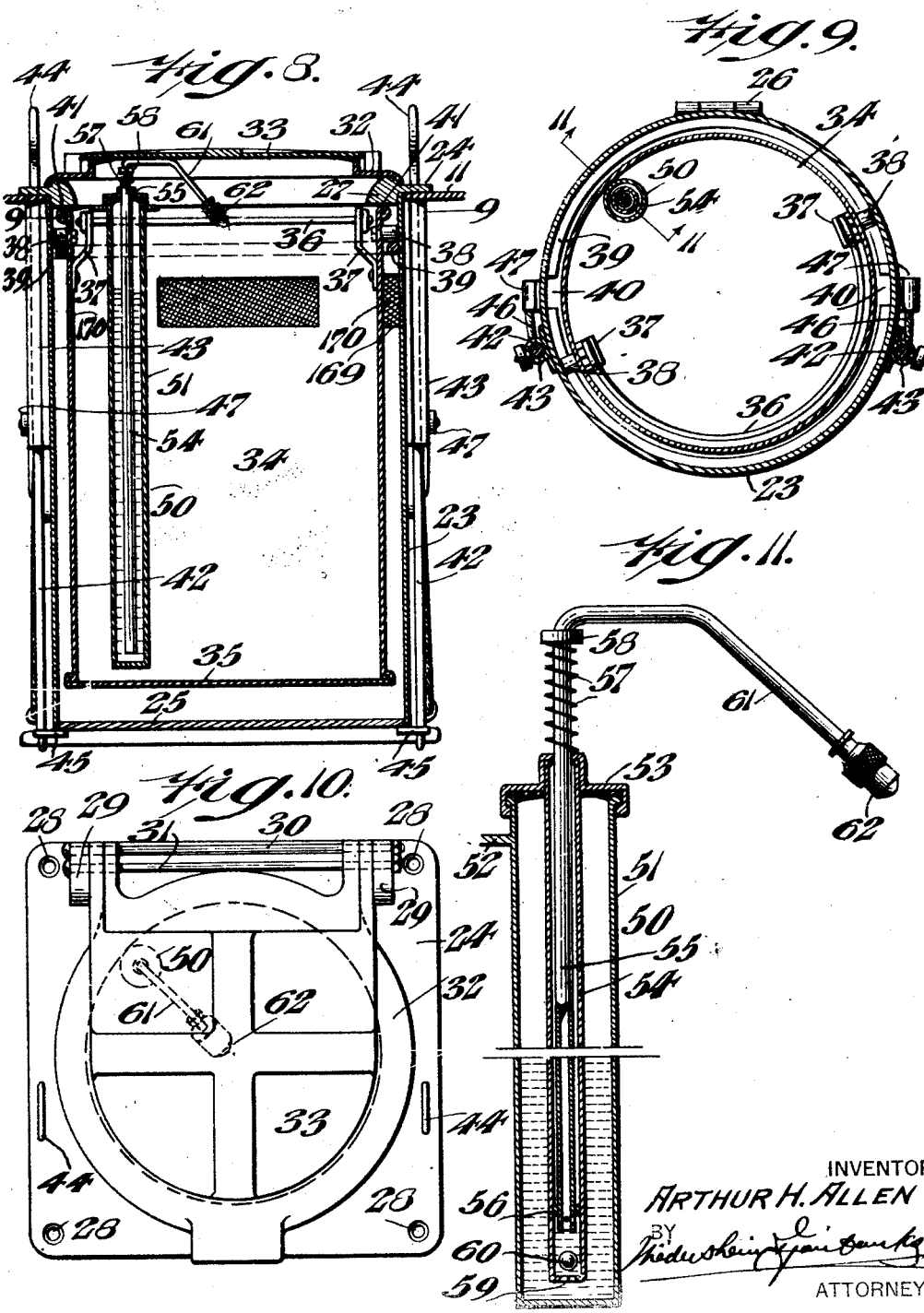

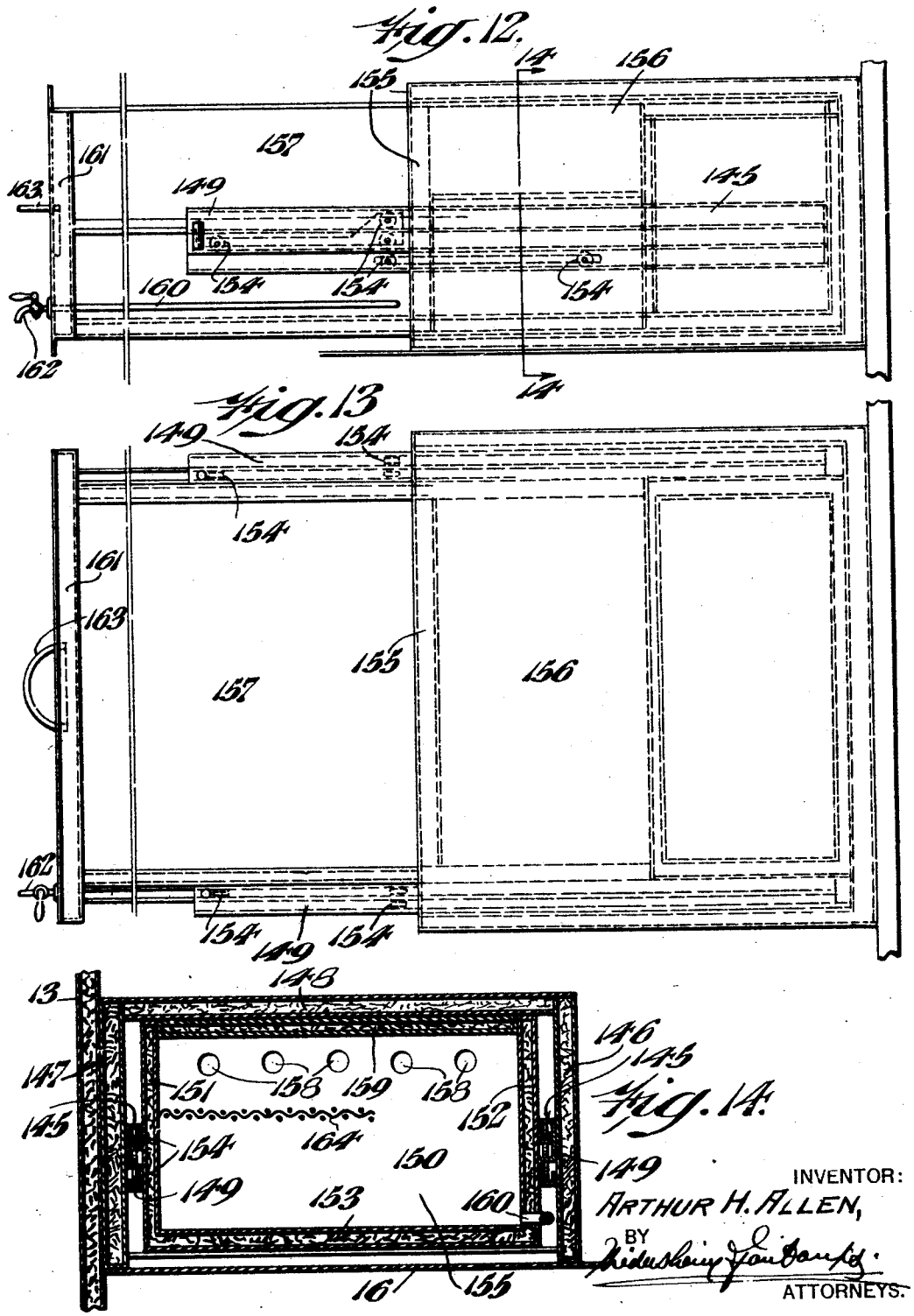

Patented Dec. 11, 1928.

1,695,133

UNITED STATES PATENT OFFICE.

ARTHUR H. ALLEN, OF PHILADELPHIA, PENNSYLVANIA.

COMBINATION SANITARY REFRIGERATOR AND WASTE-DISPOSAL APPARATUS.

Application filed April 21, 1926. Serial No. 103,514.

My invention relates to a new and useful combined sanitary refrigerator and garbage and rubbish disposal apparatus, and it relates more particularly to apparatus of the character stated, adapted to be located immediately outside of a window, preferably a kitchen window for the purpose of providing ready and convenient means for storing food and means for disposing of food offals, as well as other waste matter such as rubbish, and particularly for disposing of such offal and waste matter, from the apartments located on the upper floors of apartment houses.

One of the objects of my invention is to provide a cabinet suitably attached to the window sill, on the outside of the wall, for the purpose of storing food therein during the winter time, without the use of any ice, and for the purpose of storing food with the aid of ice, during the summer time.

A further object of my invention is to provide means whereby suitable rubbish and garbage cans, or other waste receptacles may be conveniently enclosed in a sanitary and substantially air tight manner and whereby the same may be conveniently and expeditiously lowered and raised for the purpose of removing the contents thereof, with but very little manual force. My device, is thus particularly adapted for use in apartments, where space is a vital element and where the convenience of storing food and the expeditious handling of both garbage and rubbish are of the utmost importance.

With the above ends in view, my invention consists of a suitable metallic cabinet of the height and width of the lower half of the window, and of a suitable depth extending outwardly from the wall, suitably supported outside the window sill and wall, said cabinet being divided horizontally about midway of its height, into an upper food storage compartment or chamber and a lower waste disposal compartment adapted for the handling of rubbish, garbage and the like.

My invention further consists of suitable housing for enclosing garbage container so as to maintain the same in a sanitary manner and free from insects, particularly during the summer time and means for readily detaching and removing such garbage container from said housing, and means for lowering the same, to the ground floor or courtyard, when desired, for the purpose of emptying the contents therof. My invention also consists of means for raising or lowering either the garbage or the rubbish containers and suitable means for disinfecting the garbage or refuse matter, if so desired.

My invention further consists of a novel construction in a food storage refrigerator compartment which is provided in the upper half of my novel cabinet, including a novel refrigerator drawer in said compartment, guided upon suitable horizontal supporting run-ways or rails and adapted to receive food, for storage, in the front portion thereof, and adapted to receive ice in the rear portion thereof, for the purpose of maintaining the food compartment cool at all times. By my novel drawer construction in a refrigerator compartment, the food and the ice may be stored at the same level in a compartment of relatively little height and great depth, with the utmost facility in handling both food and ice, as well as in the removal of drainage.

For the purpose of illustrating my invention, I have shown in the accompanying drawings, forms thereof which are at present preferred by me, since they will give in practice, satisfactory and reliable results, although it is to be understood that the various instrumentalities of which my invention consists can be variously arranged and organized and that my invention is not limited to the precise arrangement and organization of these instrumentalities as herein shown and described.

In the accompanying drawings,

Figure 1 represents a view in elevation of a novel combined sanitary refrigerator cabinet and garbage and rubbish disposal cabinet and apparatus, embodying my invention, showing the outside thereof with a portion of the rear or outside wall broken away, in order to expose to view the hoisting apparatus.

Figure 2 represents a section on line 2—2 of Figure 1.

Figure 3 is a detailed view of one of the pulleys of the hoisting apparatus.

Figure 4 represents a plan view of the rubbish receptacle and the slidable supports therefor.

Figure 5 is a section on line 5—5 of Figure 2, showing the construction of the hoisting apparatus.

Figure 6 represents a section on line 6—6 of Figure 5.

Figure 7 is a section on line 7—7 of Figure 5.

Figure 8 represents a section on line 8—8 of Figure 2, showing the construction of the garbage container and the outer housing or enclosure therefor.

Figure 9 is a section on line 9—9 of Figure 8.

Figure 10 is a top plan view of the garbage container and the outer housing or casing therefor, shown in Figure 8.

Figure 11 is a section on line 11—11 of Figure 9 on an enlarged scale, illustrating the disinfectant sprayer.

Figure 12 represents a side elevation of the refrigerator or food storage compartment, showing my novel drawer construction therein.

Figure 13 represents a top plan view of the same.

Figure 14 represents a section on line 14—14 of Figure 12.

Referring to the drawings, in which like reference characters indicate like parts, 1 and 2 designate the two upright window jambs of a window frame, having the lower window sill 3 and the upper and lower window sashes 4 and 5 respectively, slidably mounted therein, in the usual manner. While the window illustrated in the drawings, particularly in Figures 1 and 2, may be any one of the several windows of an apartment, it is preferably the kitchen window or the pantry window. To the outer vertical edge of the window sill 3, and to the outer surface of the wall 6, immediately below the same, are secured a pair of right angular brackets 7 and 8 respectively, by means of the bolts or other fastening means 9, as illustrated particularly in Figures 1 and 2. Upon the brackets 7 and 8 is supported the combined sanitary refrigerator and waste disposal cabinet 10 of my novel construction, shown particularly in Figures 1 and 2, in horizontal alignment with the lower half of the window. The height and width of the cabinet are of such dimensions as to substantially fit said lower half. For the purpose of giving access to the cabinet, the inner or lower window sash 5, may be removed or raised up into the upper half of the window, as indicated in Figure 2.

The cabinet 10 is composed of the bottom panel 11, the side panels 12 and 13, the rear or outside wall or panel 14 and the outwardly and downwardly inclined roof panel 15, as well as the horizontal partition or panel 16, substantially midway of the height of the cabinet, dividing the same into the upper and lower compartments 17 and 18, respectively. While in Figures 1 and 2 the panels or walls of the cabinet are shown to be merely metallic plates of single thickness, yet I may, if desired, provide double walls throughout, spaced apart a suitable distance, and having a heat insulating material therebetween, for the purpose of providing protection for the contents of the cabinet, from the heat of the sun during the summer time and from the extreme cold during the winter time. In Figures 12, 13 and 14 I have indicated the detailed construction of a portion of the upper or refrigerator compartment, showing as an alternative form, a novel drawer construction therein, and also illustrating the double wall or insulating construction to be referred to more in detail hereinafter.

In the side walls or panels 12 and 13, I may further provide suitable windows 19, slidably mounted on the horizontal guides 20, for the purpose of admitting both air and light to the compartments. If so desired, a screen slide 21, may also be provided, so as properly to protect the compartments from flies and insects, particularly during the summer time.

In the lower or bottom wall 11 of the compartment 18, which is adapted for the disposal and handling of waste such as garbage, rubbish and the like, I provide a pair of suitable openings alongside of each other, one for the handling of garbage and one for the handling of rubbish. In the opening 22, is hung and permanently and rigidly secured, a downwardly depending outer metallic cylindrical shell or housing 23 carried by the upper horizontal flange 24 thereof, having a false bottom 25 hinged thereto at 26, as indicated in Figures 2 and 9. The cylindrical outer housing 23 is secured rigidly and in a permanent and stationary manner and serves as an outer enclosure or housing for the garbage can or receptacle. The details of the construction of the garbage storage apparatus are further illustrated in Figures 8, 9, 10 and 11.

Thus, referring to Figures 8 and 9, there is seen in section, the outer cylindrical housing 23, having at the upper end thereof the metallic ring 27, preferably a cast iron ring, having formed integral therewith the outwardly projecting flange 24. The inner edge of the ring 27 is of a diameter so as to overlap the end of the cylindrical casing 23 inwardly, as shown in Figure 8. The flange 24 is preferably rectangular in shape and is provided with suitable openings 28, for the purpose of receiving the screws or rivets whereby the same may be rigidly secured to the bottom panel 11 of the cabinet, as indicated in the drawings. The flange 24 also carries a pair of hinge lugs 29, which support a pair of pintles 30 and 31, upon which are hinged the annulus 32 and the lid 33. The annulus 32 overlaps and is of the same contour and fits snugly, the round beaded portion of the terminal ring 27, while the lid 33 merely rests upon the upper edge of the annulus 32.

The garbage can or receptacle 34 is also of a cylindrical shape, but of a sufficiently smaller diameter than the outer cylindrical housing 23, to fit loosely within the same as indicated in Figures 8 and 9, and is provided with the bottom 35, and the handle 36 pivotally secured to the handle supports 37, which are riveted to the inside surface of the cylindrical garbage can 34.

The can 34 is supported on a pair of diametrically opposed lugs or projections 38, rigidly secured to the can, near the upper portion thereof, which rest upon the split annular inner rib 39, rigidly secured to the inner surface of the cylindrical housing 23. The adjacent ends of the split ring 39 are spaced apart a slight distance, at the diametrically opposed points 40, as shown in Figure 9, so as to permit the supporting lugs 38 to be raised and lowered through and past the ring 39. Thus, to position the can 34, the same is raised in a position to pass the lugs 38 through the recesses 40 in the ring 39, and the can is turned a suitable amount thereby bringing the lugs 38 onto the ring 39, thereby firmly supporting the can 34 on said ring. In the raised position shown in Figure 8, the upper beaded edge 41 bears against the lower surface of the ring 27, thereby forming a substantial seal around the edge of the can, so as to prevent garbage or offal from being scattered.

In order to permit the operation, that is, the opening and closing of the hinged false bottom 25, from above, by a person standing inside the window, there are provided a pair of rods 42, slidably mounted in the upright guides 43 and having the handles 44 at the upper ends thereof. The lower ends of the rods 42 carry the turn buttons or latch members 45, which are swung beneath the edges of the false bottom 25 by merely turning the handles 44, thereby locking said bottom in the upper closed position. In order to raise and lower the bottom 25 there are provided the flexible cords, ropes or chains 46, passing over the pulleys or sheaves 47, and having one of their ends secured to suitable eyelets 48 on the edge of the hinged bottom 25, and having their other ends secured to suitable eyelets 49 on the lower end of the rods 42. Thus, upon turning the handles 44 so as to unlock the turn buttons 45, the weight of the hinged cover 25 will cause the latter to drop into the vertical position indicated in dotted lines in Figure 2, and will at the same time raise the rods 42 upwardly, through the ropes or cables 46. When it is desired to close the bottom 25 into the horizontal position again, it is merely necessary to force the rods 42 downwardly thereby raising the bottom 25 into the closed position, and subsequently turning the handles 44 so as to lock the said bottom in such position. By this means the outer housing 23 may be opened at the bottom thereof for the purpose of removing or inserting the garbage can or receptacle 34, through the bottom thereof, when it is desired to empty the contents thereof.

In order to suitably disinfect or deodorize the garbage refuse, and particularly in the summer time, or when through circumstances it is necessary to store the waste for a considerable length of time, and thus to maintain the storage of the waste matter sanitary at all times, there is provided a spraying device 50, comprising the outer elongated cylindrical container 51, which is rigidly secured to the stationary ring 27, by means of the lug or flange 52, the upper cover 53, the concentric pump cylinder 54 of lesser diameter, and the hollow piston rod 55 extending through the top 53, into the tubular pump cylinder 54, as shown particularly in Figures 9 and 11. The tubular piston rod 55 carries a suitable packing washer or piston 56 at the lower end thereof, while the helical compression spring 57, interposed between the stationary lid 53 and the collar 58, serves to urge the piston rod 55, in an upward direction at all times. The tubular pump cylinder 54 is provided with an intake port 59 at the lower end thereof, which also serves as a seat for the ball check valve 60. Thus, upon forcing the hollow piston rod 55 downwardly, the ball check valve 60 is seated over the intake opening 59 and the liquid contained in the bottom of the tubular pump cylinder 54 is forced out through the hollow piston rod 55, and out through the discharge tube 61, which in the illustration shown, is merely a continuation of the piston rod, and hence, out through the spraying nozzle 62. The spraying apparatus 50, containing a suitable disinfectant liquid, is so positioned within the garbage can 34, as to be actuated by the lowering of the lid 33. Thus each time that waste is deposited in the garbage can and the lid 33 thereof is subsequently lowered or closed, the piston rod 55 is lowered and hence a charge of the disinfectant solution is sprayed on the contents of the can, as will readily be seen from Figures 8 to 11 inclusive.

Beneath the second opening 64, of the bottom panel 11, of the cabinet 10, are disposed a pair of horizontal and parallel outwardly projecting supporting and guide rails 65 and 66, having guide channels 67 and 68 therein, facing each other; in which channels, a rectangular supporting plate 69 is adapted to be supported in a slidable manner. The plate 69 is provided with a circular opening 70, of suitable diameter, and a pair of diametrically opposed recesses 71 in the edges of said opening. The rubbish or waste can 72, is of a diameter slightly less than the diameter of the opening 70, and extends through the opening, and is supported by means of a pair of lugs 73, carried by said can, resting upon the upper surface of the plate 69. In order to remove or lower the can from the plate 69 it is merely necessary to turn the can until the two lugs 73 pass through the recesses 71. The can 72 is likewise provided with a suitable pivotally mounted handle 74.

In order to permit the raising and lowering of either the garbage can 34 or the rubbish can 72, there is provided a novel hoisting device secured to the partition or median wall 16 and the side and rear walls 13 and 14 of the cabinet, as shown particularly in Figure 1, 2 and 5. The hoisting device includes a drum 75 upon which a suitable cable or rope 76 is wound, having a suitable hook 77 at the free end thereof, and passing over a suitable sheave or pulley 78. Thus, in order to handle either one of the cans 34 or 72 it is merely necessary to attach the hook 77 to the corresponding handles and then to raise or lower the can. In order to adapt the same drum to hoisting of either of the two cans, a second sheave or pulley is provided, positioned directly above the can 34, onto which sheave the rope 76 may be hung, when it is desired to handle the can 34; said sheave 79 being shown in detail on an enlarged scale in Figure 3. The hoisting apparatus shown in detail particularly in Figures 2, 5, 6 and 7, is supported from the partition wall 16, the side wall 13, and the rear wall 14, by means of the base plates or supports 80, 81 and 82, secured to the respective walls as shown in Figure 5. The base plate 80 has threadedly secured thereto, a piece of pipe 83, which in turn carries a T pipe connection 84, which serves as a bearing and support for the drum mechanism. The base plate 81 has threadedly secured thereto the pipe 85, which also serves as an end support. Thus, the horizontal stationary shaft 86 is supported at one end in the tube 85, and is supported at the other end thereof in a suitably recessed plug 87, in the T pipe connection 84.

The driving sprocket wheel 88, is driven by the crank 89 and the handle 90 which are in turn carried by a sleeve 91. The sleeve 91 is rotatably mounted on the stationary sleeve shaft 92. The stationary sleeve shaft 92 is supported by the base plate 82, the pipe coupling 93, and the T pipe coupling 94, in a manner shown in Figure 5. The outer end of the sleeve coupling 94 serves as a bearing for the revolving sleeve shaft 91. In order to support and maintain the driving sprocket wheel 88 in constant and rigid relation to the drum mechanism above, there is interposed a hollow pipe brace 95, between the T pipe connection 94 and the stationary shaft 86.

Upon the stationary horizontal shaft 86, there are rotatably mounted two tubular or sleeve shafts 96 and 97 having their contiguous ends 98 and 99 respectively, formed with a pair of corresponding teeth having one of their edges inclined, and having their other edges extending parallel to the axis of the shafts, so that upon revolving the shaft 97, in the direction indicated by the arrow 100 in Figure 6, the inclined edges of the end 99 of the driving shaft 97, will engage the correspondingly inclined edges of the end 98 of the driven shaft 96, in a wedge like manner. Since the clearance between the ends 99 and 98 of the driving shaft 97 and the driven shaft 96 is but slight, the shaft 97 will therefore, firmly engage and revolve or carry with it, the driven shaft 96, as soon as the clearance or play between the ends 98 and 99 is taken up. The driven sprocket wheel 101 is rigidly secured to the driving shaft 97 by means of the set screws 102, and is actuated or revolved by means of the crank 89 and the handle 90, through the sprocket chain 103, passing over the driving sprocket wheel 88 and the driven sprocket wheel 101.

The drum 75 as shown in Figure 5, is built up of the terminal discs 104 and 105 respectively, which are rotatably mounted upon the two sleeve shafts 96 and 97 respectively, and have the circular portion 106 and 107 of lesser diameter and concentric with the axis of the shafts 96 and 97, upon which is supported the ends of a cylinder 108, forming the body of the drum. The parallel stay and guide rods 109 and 110 extend through the two end or terminal discs 104 and 105 and are secured thereto by means of the nuts 111, and serve to clamp the same together and to securely hold the cylinder 108 therebetween. Within the cylinder 108 is disposed a multiple disc friction clutch 112, composed of the alternate discs 113 and 114 of any suitable material or materials. The discs 113 are of a larger diameter fitting loosely within the cylinder 108, and have suitable diametrically opposed openings 115 therethrough, through which the rods 109 and 110 pass. By this means, a positive mechanical connection is established between the large discs 113 and the drum 75. The discs 113 are also provided with suitable central openings 116, of sufficient diameter to clear the sleeve shaft 96, as well as the keys 117, carried by said sleeve shaft, as shown particularly in Figures 5 and 6.

The smaller discs 114 are of a sufficiently small diameter to clear the guide or stay rods 109 and 110, and are keyed onto the sleeve shaft 96, by means of said keys 117, though they are slidable longitudinally of said shaft, a suitable amount. The end disc 118, having the boss 119, serves to exert an axial thrust upon the stack of alternating discs 113 and 114, thereby to effect a frictional engagement between the respective discs. The disc 118 is further rigidly secured to the sleeve shaft 96, by means of suitable set screws 120. Thus, while in the normal or inoperative position of the hoisting or reeling mechanism, the drum 75 is free to rotate with respect to the shaft 96, yet as soon as the driving shaft 97 is revolved in a direction indicated by the arrow 100, and also indicated by the arrow 121 showing the direction of the sprocket chain 103, the shaft 96 will be engaged by the shaft 97 in a wedge-like manner, thereby not only revolving said shaft 96 and hence the discs 114, but also compressing the discs 114 and 113, so as frictionally to engage said discs 113 and hence to revolve the drum 75.

Thus, the rope 76 is wound up upon the cylinder 108, when said cylinder is revolved in a direction of the arrow 100, by the manual force exerted on the handle 90, while the unwinding of the rope 76 or the lowering operation is effected merely by the weight of the object suspended on the rope, since the drum 75 is free to revolve in the opposite direction; the clutch 112 substantially inoperative except when actuated by the wedging action of the contiguous ends of the shafts 96 and 97, as brought out hereinbefore.

The helical spring 122, surrounding the shaft 97 has one end thereof secured to a bolt 123, carried by a collar 124 which is rigidly secured to the shaft 97, and has the other end thereof secured to one of the screws or bolts 120. The spring 122 exerts a torsional moment between the two shafts 96 and 97, so as normally to maintain the inclined wedging ends thereof in operative relation with each other. The wedging action thus obtained between the two shafts 96 and 97, due to the torsional force of the spring 122, is merely of sufficient magnitude, normally to maintain the discs 113 and 114 of the clutch 112, in a slightly compressed state. Thus, while the drum 75 is normally free to rotate upon the shafts 96 and 97, it is retarded frictionally to a slight extent by the slight action of the clutch 112 due to the constant torsional force of the spring 122; the shaft 96 being maintained against any rotation in a direction counter to the arrow 100, by means of the ratchet wheel 125, which is secured to said shaft 96 by means of the said screws 126, and the spring pawl 127. Thus, while the drum 75 is revolved in the direction of the arrow 100 when lifting or hoisting one of the cans 72 or 34, by the action of the crank 89, and the driving shaft 97, yet the counter revolution of the drum 75, that is, the lowering operation, is effected merely by the weight of the cans 34 or 72, as the case may be. The frictional action of the clutch 112, due to the action of the spring 122, is normally sufficient to maintain the drum stationary and to prevent the descent of the cans by their own weight. If it is desired therefore, to lower an object, it is merely necessary to reverse the shaft 97, in a direction counter to the direction of the arrow 100, by means of the handle 90, until the inclined terminal edges of the shafts 96 and 97 are separated from their operative wedging engagement caused by the torsional force of the spring 122. When the inclined wedging edges of the ends 98 and 99 are thus separated, the drum 75 is entirely free to rotate and the object on the rope 76 is thus lowered. If it is desired to retard or check the descent of the object thus being lowered by the drum 75, it is merely necessary to turn the handle 90 a slight amount, as if to raise the object, thereby restoring the action of the spring 122, in compressing the clutch 112, by means of the wedging action between the ends 98 and 99 of the shafts 96 and 97 respectively.

In order to counter-balance the weight of the object to be raised, by means of the drum 75, I interconnect the drum 75 with a suitable spring balance 128, shown particularly in Figures 1 and 2, of the usual construction employed in balancing window sashes. The counterbalance 128 consists of a substantial flat helical spring within a suitable housing, upon which housing is wound a flexible steel tape of suitable length. The free end of the steel tape 129 is secured to a drum 130, which is rigidly secured to the main drum 75 by means of the screws 131. Thus, as the rope 76 is unwound from the drum 75, the steel tape of the counterbalance 128 is wound up on the drum 130, thereby winding up also the coil spring within said counterbalance 128. Thus, the counterbalance 128 will assist in raising object by the force of the spring within the same, and thus reduce the amount of manual force necessary.

The upper food compartment 17, shown generally in Figures 1 and 2, may be provided with a suitable shelf 133; and the sliding doors 134 and 135, guided upon the horizontal guide strips or rods 136 and 137 respectively, and having suitable glass panels 138 and 139 respectively; each of said doors extending halfway across the width of the cabinet and adapted to slide or telescope past each other, as shown in Figure 2. The lower waste compartment 18 may also be provided with a pair of sliding doors 140 and 141, guided upon the guide strips or rods 142 and 143 respectively, and having either glass or opaque panels 144, as may be desirable.

In Figures 12, 13 and 14 there is illustrated in detail a modified construction of the upper food storage compartment 17, wherein the same is fitted with a novel refrigerator drawer for the purpose of facilitating the handling of both food and ice and for effecting a material saving in space occupied. Moreover, in this modified construction, there is also illustrated a double wall, heat insulating construction. In this construction as well, 16 designates the horizontal partition or dividing panel between the two compartments 17 and 18, while 13 designates the side wall, also shown in Figure 1, formed of a pair of spaced panels having a suitable insulating material therebetween.

Within the upper compartment 17 there is also provided a chamber extending clear through from front to back, formed also of the double spaced walls 146 and 147 and the top 148, also having suitable insulating material therebetween, and adapted to receive my novel refrigerator. To the inner surfaces of the walls 146 and 147, suitable horizontal guide rails 145 are secured, upon which are slidably mounted the extensible supporting rails 149; upon which in turn is slidably mounted the refrigerator drawer 150, also formed of the double panel heat insulated walls 151 and 152 and the bottom 153. The guide rails and supporting rails may be of any usual construction, either directly supported on one another, or mounted on suitable anti-friction rollers 154.

The refrigerator drawer 150 is further provided with a dividing wall 155, extending transversely thereof, for the purpose of dividing the drawer 150 into a rear ice compartment 156 and a front food compartment 157. Suitable holes 158 in the upper part of said dividing wall 155, may be provided for the circulation of the cold air between the ice and the food compartment. A removable cover plate 159 may be superimposed upon the ice compartment, for further excluding therefrom the warm air, when the drawer is opened for the purpose of reaching the food compartment. The drain pipe 160 may be provided extending from the ice compartment towards the front end of the refrigerator drawer, and through the front wall or panel 161, and terminating in a suitable stop cock 162, through which the water may be drained from the ice compartment. A suitable handle 163, may further be provided to facilitate the opening and closing of the refrigerator drawer 150. A shelf 164 may also be provided extending partly across the food compartment 157 of the refrigerator drawer 150 and at a suitable height to enhance the utility thereof.

In order to shed water, such as rain and the like, between the window sash 4 and the roof 15 of the novel refrigerator and waste cabinet 10, there is provided a suitable flap or strip of metal 165, pivoted longitudinally at 166, which may be fastened to a lower edge of the window sash 4, by a series of screws 167. If it is desired to lower the sash 4 for any reason whatsoever, it is merely necessary to remove the screws 167 and to tilt the metallic strip 165 into a vertical position as indicated by the arrow 168.

In order to provide ventilation for the garbage container and thus to remove any odors, there may be provided a number of apertures 169 in the outer housing 23, suitably screened by means of the screens 170.

It will thus be seen that by my novel combined refrigerator and waste disposal cabinet, there is provided in a unitary structure, means for both storing food and for the disposal of food waste, as well as other waste, and for accomplishing these ends in a highly convenient, expeditious and easy manner and with considerable saving of space. This novel construction is of particular utility, as brought out hereinbefore, in apartment houses where space and convenience in handling materials for the kitchen are of vital importance. Thus, by this novel construction the usual space required for refrigerator and waste and garbage cans is entirely saved, while the waste and garbage cans, by means of this novel construction, may be handled entirely outside of the kitchen, thereby eliminating the odor and other objectionable features incident to the handling of the garbage within the room. Thus, the garbage can 34 and the rubbish can 72 are normally held in position as shown in Figures 1 and 2, in a pendant position, beneath the cabinet 10, having only the upper ends of said cans projecting through suitable openings in the bottom of said cabinet. For the purpose of emptying said rubbish and garbage containers, the rope 76 is merely attached to the handle of the receptacle, the receptacle is freed from its support by a slight turn thereof and the receptacle may then be lowered into the ground where it is received by the garbage or rubbish collectors, or the janitor of the apartment house.

Upon reference to Figures 1 and 4, it will be seen that the rubbish can 72 is carried by a supporting plate 69 which is slidably mounted upon the rails 66, and is normally positioned directly beneath the hoisting apparatus. By this construction, novel means are provided, not only for raising and lowering said rubbish container 72, but also for lowering and raising other articles such as food materials, ice and other kitchen supplies, by merely sliding the plate 69 together with the garbage container 72, outwardly from beneath the hoisting apparatus, into the outermost position on the outer ends of the rails 66, thereby providing a clear space, through the bottom 11 of the cabinet 10, directly below the sheave 78, through which space the rope 76 may be lowered for the purpose of lowering or raising food supplies, baskets, ice and so forth. Due to the spring counterbalance 128, the lifting or raising of objects is greatly facilitated, that is, the manual force required to raise the same is greatly reduced, thereby making this construction highly adapted for domestic purposes since it may very readily be operated by women.

Having thus described my invention, what I claim as new and desire to secure by Letters Patent, is:—

1. A waste disposal cabinet, of the character stated, comprising an upper food storage compartment, a lower waste disposal compartment having an opening in the bottom thereof, a pendant waste receptacle detachably supported beneath said cabinet and having its upper end in alignment with and in proximity to said opening, and means to raise and lower said receptacle.

2. A waste disposal cabinet, of the character stated, comprising an upper food storage compartment, a lower waste disposal compartment, having a plurality of openings in the bottom thereof, corresponding pendant waste receptacles detachably supported beneath said cabinet and having their upper ends in alignment with and in proximity to said corresponding openings in the bottom of said compartment and hoisting means adapted to be attached to either one of said waste receptacles to raise and lower the same.

3. A waste disposal cabinet, of the character stated, comprising an upper food storage compartment, a lower waste disposal compartment having an opening through the bottom thereof, a pair of guide rails disposed beneath said opening and in operative alignment therewith and extending outwardly beyond said cabinet, and a pendant waste receptacle detachably mounted on said guide rails and adapted to slide to and fro thereon into a position directly below and in alignment with said opening and into an outer position, thereby to clear said opening.

4. A waste disposal cabinet, of the character stated, comprising an upper food storage compartment, a lower waste disposal compartment having an opening through the bottom thereof, a pair of guide rails disposed beneath said opening and in operative alignment therewith and extending outwardly beyond said cabinet, a pendant waste receptacle detachably mounted on said guide rails and adapted to slide to and fro thereon into a position directly below and in alignment with said opening and into an outer position, thereby to clear said opening, and hoisting means in said lower waste disposal compartment, adapted to raise and lower said receptacle and also adapted to raise and lower other objects through said opening in the bottom of said lower compartment when the receptacle is in the outer position.

5. A waste disposal cabinet, of the character stated, including a waste disposal compartment having an opening in the bottom thereof, a stationary housing beneath said opening and rigidly secured to the bottom of said compartment, said housing having a false bottom, a pendant waste receptacle of lesser dimensions than said outer housing, detachably mounted within the same and a hoisting device within said waste disposal compartment, adapted to raise and lower said waste receptacle when the latter is detached, through the bottom of said outer housing.

6. In a device of the character stated, a waste disposal compartment, having an aperture extending through the bottom thereof, a pendant waste container detachably and slidably secured beneath said aperture and in alignment therewith, and means to guide said pendant container, in a horizontal direction from under said aperture to an outer position, and a hoisting device positioned above and in operative alignment with said aperture, adapted to raise and lower said waste container and also other objects through said aperture.

7. In a device of the character stated, a waste disposal compartment, having an aperture through the bottom thereof, a pair of laterally disposed guide rails positioned beneath and in operative alignment with said aperture, a supporting plate extending between said two guide rails and slidably supported thereon and having a suitable aperture therethrough, a pendant waste container detachably secured to said plate whereby said waste container may be positioned beneath and in operative alignment with said aperture in the bottom of said waste compartment and whereby the same may be displaced into an outer position from beneath said aperture by sliding the same along said guide rails.

8. In a device of the character stated, a pair of horizontally disposed guide rails, a supporting plate extending therebetween and slidably supported thereby, said plate having a suitable aperture extending therethrough, spaced notches in the periphery of said aperture, a waste can of a diameter adapted to enter said aperture from beneath and lateral lugs carried by said receptacle in alignment with and adapted to pass through said recesses in said plate, whereby said receptacle may be secured in said plate, in a detachable manner, by means of said lugs resting upon said plate at the edge of the aperture.

9. In a device of the character stated, an upright tubular housing, a removable lid therefor, a false bottom therefor, a pendant waste receptacle adapted to be contained within said housing, horizontally disposed circular ribs carried by the inner surface of said housing near the upper end thereof, having their adjacent ends spaced apart a suitable distance, and laterally projecting lugs carried by said receptacle adapted to enter between the adjacent ends of said ribs and to rest upon the top of said ribs thereby to support said receptacle.

10. In a device of the character stated, an upright tubular housing, a removable lid therefor, a false bottom therefor, a pendant waste receptacle adapted to be contained within said housing, horizontally disposed circular ribs carried by the inner surface of said housing near the upper end thereof, having their adjacent ends spaced apart a suitable distance, laterally projecting lugs carried by said receptacle adapted to enter between the adjacent ends of said ribs and to rest upon the top of said ribs thereby to support said receptacle, a handle extending above said housing, and means carried by said housing whereby said false bottom may be opened and closed by the manual manipulation of said handle from above said housing.

ARTHUR H. ALLEN.